US010844241B2

(12) United States Patent
Steinmetz et al.

(10) Patent No.: US 10,844,241 B2
(45) Date of Patent: Nov. 24, 2020

(54) DIMER FATTY ACID/DIMER DIOL REACTION PRODUCT AND USE THEREOF IN COATING MATERIALS

(71) Applicant: BASF Coatings GmbH, Muenster (DE)

(72) Inventors: Bernhard Steinmetz, Ruetschenhausen (DE); Hardy Reuter, Muenster (DE); Peter Hoffmann, Senden (DE)

(73) Assignee: BASF Coatings GmbH, Muenster (DE)

(*) Notice: Subject to any disclaimer, the term of this patent is extended or adjusted under 35 U.S.C. 154(b) by 0 days.

(21) Appl. No.: 16/125,429

(22) Filed: Sep. 7, 2018

(65) Prior Publication Data

US 2019/0002729 A1 Jan. 3, 2019

Related U.S. Application Data

(62) Division of application No. 14/913,255, filed as application No. PCT/EP2014/065520 on Jul. 18, 2014, now abandoned.

(30) Foreign Application Priority Data

Aug. 28, 2013 (EP) ..................................... 13182101
Dec. 17, 2013 (EP) ..................................... 13197870

(51) Int. Cl.
| | | |
|---|---|---|
| C09D 167/02 | (2006.01) | |
| C08G 63/16 | (2006.01) | |
| C09D 175/04 | (2006.01) | |
| B05D 7/00 | (2006.01) | |
| C08G 63/553 | (2006.01) | |
| C09D 167/08 | (2006.01) | |

(52) U.S. Cl.
CPC ............ *C09D 167/02* (2013.01); *B05D 7/50* (2013.01); *C08G 63/16* (2013.01); *C08G 63/553* (2013.01); *C09D 167/08* (2013.01); *C09D 175/04* (2013.01); *B05D 7/534* (2013.01)

(58) Field of Classification Search
CPC .. C08G 63/16; C08G 18/4233; C09D 175/04; C09D 175/06; C09D 167/02; B05D 7/50
See application file for complete search history.

(56) References Cited

U.S. PATENT DOCUMENTS

| | | | | |
|---|---|---|---|---|
| 5,569,707 A | * | 10/1996 | Blum | ................. C08G 18/0819 524/539 |
| 5,601,880 A | | 2/1997 | Schwarte et al. | |
| 5,977,256 A | * | 11/1999 | Huybrechts | ........ C08G 18/4063 524/507 |
| 6,372,875 B1 | * | 4/2002 | Mayer | ................. C08G 18/0819 428/425.8 |
| 2005/0096690 A1 | | 5/2005 | Gazza | |
| 2005/0112156 A1 | | 5/2005 | Busch et al. | |
| 2010/0062168 A1 | * | 3/2010 | Poppe | ...................... C09D 5/29 427/387 |
| 2012/0301717 A1 | | 11/2012 | Takahira et al. | |
| 2013/0231445 A1 | * | 9/2013 | Vendamme | ............ C09J 167/02 525/438 |

FOREIGN PATENT DOCUMENTS

| | | |
|---|---|---|
| DE | 1 198 348 | 8/1965 |
| DE | 1 768 313 | 4/1971 |
| DE | 40 09 858 A1 | 10/1991 |
| DE | 44 37 535 A | 4/1996 |
| DE | 199 14 896 A1 | 10/2000 |
| DE | 199 30 665 A1 | 1/2001 |
| DE | 199 48 004 A1 | 7/2001 |
| DE | 100 43 405 C1 | 6/2002 |
| EP | 0 228 003 A1 | 7/1987 |
| EP | 0 521 928 B1 | 8/1994 |
| EP | 0 634 431 A1 | 1/1995 |
| JP | 6-500146 A | 1/1994 |
| JP | 6-212123 A | 8/1994 |
| JP | 9-505619 A | 6/1997 |
| JP | 2011-116858 A | 6/2011 |
| JP | 2012-116879 A | 6/2012 |
| JP | 2012-526864 A | 11/2012 |
| JP | 2012-526865 A | 11/2012 |
| WO | WO 91/13918 | 9/1991 |
| WO | 92/15405 A1 | 9/1992 |
| WO | WO 2007/049028 A2 | 5/2007 |
| WO | WO 2011/055827 A1 | 5/2011 |
| WO | WO 2013/041515 A1 | 3/2013 |

OTHER PUBLICATIONS

Pripol 2033—Croda coatings and polymers, Croda website published on Oct. 1995.*
International Search Report dated Jan. 14, 2015, in PCT/EP2014/065520 filed Jul. 18, 2014.
International Preliminary Report on Patentability and Written Opinion dated Mar. 10, 2016 in PCT/EP2014/065520 filed Jul. 18, 2014 (submitting English translation only).
Notice of Opposition issued Feb. 13, 2018 in European Patent Application No. 14746981.1.

(Continued)

*Primary Examiner* — Gregory Listvoyb
(74) *Attorney, Agent, or Firm* — Oblon, McClelland, Maier & Neustadt, L.L.P.

(57) ABSTRACT

The present invention relates to a dimer fatty acid/dimer diol reaction product which is preparable by reacting (a) dimer fatty acids with (b) at least one dimer diol, where components (a) and (b) are used in a molar ratio of 0.7/2.3 to 1.3/1.7 and the resulting dimer fatty acid/dimer diol reaction product possesses a number-average molecular weight of 1200 to 5000 g/mol and an acid number <10 mg KOH/g. The invention further relates to a pigmented aqueous basecoat material which comprises this dimer fatty acid/dimer diol reaction product, and also to the use of said dimer fatty acid/dimer diol reaction product in pigmented aqueous basecoat materials. It relates, further, to a method for producing multicast paint systems, and also to the multicoat paint systems producible by means of said method. The present invention relates, furthermore, to the refinishing of defects on multicoat paint systems.

14 Claims, No Drawings

(56) References Cited

OTHER PUBLICATIONS

"Terms and Formulas Used in Urethane Polymer Preparations", Monument Chemical Kentucky LLC., Jul. 2017, 9 pages.
"Declaration in accordance with Art, 117 EPC", Dr. Angela Leonarda Maria SMITS, Document reference. E10, Feb. 2, 2018, 2 pages.
"Priplast Dimer based polyester polyols for speciality polyurethane elastomers", Unichema International, Sep. 1997, 4 pages.
"Product specification for PRIPLAST 3197 which provide evidence of the properties of PRIPLAST 3197", OHAR, Sep. 10, 1992, 2 pages.

* cited by examiner

DIMER FATTY ACID/DIMER DIOL REACTION PRODUCT AND USE THEREOF IN COATING MATERIALS

The present application is a divisional of U.S. Ser. No. 14/913,255, filed Feb. 19, 2016, which is a National Stage (35 U.S. § 371) of PCT/EP2014/065520, filed Jul. 18, 2014, and claims priority to EP 13182101.9, filed Aug. 28, 2013, and EP 13197870.2, filed Dec. 17, 2013.

The invention relates to an innovative dimer fatty acid/dimer diol reaction product. It further relates to a pigmented aqueous basecoat material which comprises this reaction product, and also to the use of said reaction product in pigmented aqueous basecoat materials. It relates, further, to a method for producing muiticoaf paint systems, and also to the multicoat paint systems producible by means of said method. The present invention relates, further, to the refinishing of defect sites on multicoat paint systems.

In the prior art there are a host of known methods for producing multiple-coat color and/or effect paint systems. Known from the prior art (cf., e.g., German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) is the following method, in which (1) a pigmented aqueous basecoat material is applied to a substrate,
(2) a polymer film is formed from the coating material applied in stage {1},
(3) a clearcoat material is applied to the resulting baseeoat film, and subsequently
(4) the baseeoat film is cured together with the clearcoat film.

This method is used extensively, for example, both for original finishing (OEM) of automobiles and for the finishing of ancillary components made of metal and plastic. In such operations, under certain conditions, there are adhesion problems, particularly between basecoat and clearcoat. The method is also used, furthermore, for the refinishing of automobile bodies. This refers both to OEM automobile refinishing and also to the automotive refinishing which takes place, for example, in a workshop. A particular problem here is the adhesion between the original finish and the basecoat that is used in the refinishing operation.

It was an object of the present invention, therefore, to provide a reaction product by means of which coatings can be produced that do not have the above-identified disadvantages of the prior art. This refers to an improvement in adhesion both in the finishing of metallic and plastics substrates and in automotive refinishing. In the finishing of metallic and plastics substrates, the focus here, as well as the adhesion of the basecoat to the substrate, is on the. adhesion between basecoat and clearcoat. In automotive refinishing, as well as the adhesion between basecoat and clearcoat, the focus is on the adhesion between basecoat and original finish. This adhesion is to be improved in particular for use in OEM automotive refinishing.

The problems of adhesion are apparent especially when the coated substrates are exposed to weathering. It was a further object of the present invention, therefore, to provide coatings which even after having been exposed to weathering still possess outstanding adhesion properties.

Poor adhesion in the case of exposure through weathering is also manifested particularly in the occurrence of blisters and swelling. A further object of the present invention, furthermore, was to prevent or reduce the occurrence of blisters and swelling.

These objects have surprisingly been achieved by means of a dimer fatty acid/dimer diol reaction product which is preparable by reacting
(a) aimer fatty acids with
(b) at least one dimer diol,
where components (a) and (b) are used in a molar ratio of 0.7/2.3 to 1.3/1.7 and the resulting dimer fatty acid/dimer diol reaction product possesses a number-average molecular weight of 1200 to 5000 g/mol and an acid number <10 mg KOH/g.

For the purposes of the present invention, unless specifically indicated otherwise, the number-average molecular weight is determined by means of vapor pressure osmosis. Measurement was made using a vapor pressure osmometer (model 10.00 from Knauer) on concentration series of the component under analysis in toluene at 50° C with benzophenone as calibration substance for determining the experimental calibration constant for the instrument being used (cf. also E. Schröder, G. Müller, K. F. Arndt, "Leitfaden der Polymercharakterisierung", Akademie-Verlag Berlin, pp. 47 to 54, 1982, which used benzil as calibration substance).

Component (a):

Dimer fatty acids (also known as dimerized fatty acids or simply dimer acids) are mixtures prepared by oligomerization of unsaturated fatty acids. Starting materials which can be used include unsaturated $C_{12}$ to $C_{22}$ fatty acids. Depending on the number and position of the double bonds in the $C_{12}$ to $C_{22}$ fatty acids used for preparing the dimer fatty acids, the carboxyl groups of the dimer fatty acids are joined to one another by hydrocarbon radicals having predominantly 24 to 44carbon atoms. These hydrocarbon radicals are commonly branched and may contain double bonds, $C_6$ cycloaliphatic hydrocarbon radicals or $C_6$ aromatic hydrocarbon radicals; these cycloaliphatic radicals and/or these aromatic radicals may also be fused. The radicals which join the carboxyl groups of the dimer fatty acids preferably have no aromatic hydrocarbon radicals, more preferably no unsaturated bonds and no aromatic hydrocarbon radicals.

The present invention prefers use of $C_{18}$ fatty acids. Particularly preferred is use of $C_{18}$ fatty acids, and very preferably of linolenic, linoleic and/or oleic acid.

Depending on the reaction regime, the oligomerization referred to above produces a mixture which comprises primarily dimeric molecules but also trimeric molecules and also monomeric molecules and other byproducts. Purification commonly takes place distillatively. Commercial dimer fatty acids generally contain at least 80 wt % of dimeric molecules, up to 19 wt % of trimeric molecules, and not more than 1 wt % of monomeric molecules and of other byproducts.

For the purposes of the present invention it is preferred that dimer fatty acids are used that consist of ≥90 wt % of dimeric molecules, ≤5 wt % of trimeric molecules, and ≤5 wt % of monomeric molecules and of other byproducts. Particular preference is given to the use of dimer fatty acids which consist of 95 to 98 wt % of dimeric molecules, less than 5 wt % of trimeric molecules, and less than 1 wt % of monomeric molecules and of any other byproducts present. Likewise particularly preferred is the use of dimer fatty acids which consist of ≥98 wt % of dimeric molecules, ≤1.5 wt % of trimeric molecules, and ≤0.5 wt % of monomeric molecules and of other byproducts.

Depending on reaction regime, dimer fatty acids contain both aliphatic and aromatic molecular fragments. The aliphatic molecular fragments can be divided further into linear and cyclic fragments, which in turn may be saturated or unsaturated. Through hydrogenation it is possible to convert the aromatic and the unsaturated aliphatic molecular fragments into corresponding saturated aliphatic molecular fragments.

Particularly preferred are those dimer fatty acids which consist of ≥98 wt % of dimeric molecules, ≤1.5 wt % of trimeric molecules, and ≤0.5 wt % of monomeric molecules and of other byproducts.

Dimer fatty acids for especially preferred use include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Unichema, Empol 100S, Empol 1061, and Empol 1062 from Cognis, and Onidyme 10 and Unidyme TI from Arizona Chemical.

Component (b):

Dimer diols have been known for a long time and in the scientific literature are also referred to as dimeric fatty alcohols. They constitute mixtures prepared, for example, by oligomerizing unsaturated fatty acids or their esters and subsequently hydrogenating the acid groups or ester groups, or by oligomerizing unsaturated fatty alcohols. Starting materials that may be used include unsaturated $C_{12}$ to $C_{22}$ fatty acids or their esters, or unsaturated $C_{12}$ to $C_{22}$ fatty alcohols. The hydrocarbon radicals joining the hydroxyl groups in the dimer diols are defined as for the hydrocarbon radicals which separate the carboxyl groups of the dimer fatty acids.

Thus, for example, DE-11 98 348 describes their preparation by dimerizing unsaturated fatty alcohols with basic alkaline earth metal compounds at more than 280° C.

They may also be prepared by hydrogenating dimer fatty acids and/or their esters in accordance with German published specification DE-B-17 68 313. Under the circumstances described therein, there is not only hydrogenation of the carboxyl groups of the fatty acids to hydroxyl groups, but also partial or complete hydrogenation of any double bonds that may be still present in the dimer fatty acids and/or their esters. It is also possible, however, to carry out the hydrogenation in such a way that the double bonds are completely retained during the hydrogenation. In that case, unsaturated dimer dials are obtained. The hydrogenation is preferably carried out in such a way that the double bonds are hydrogenated as fully as possible.

Another way of preparing dimer diols is the dimerization of unsaturated alcohols in the presence of siliceous earth/alum earth catalysts and basic alkali metal compounds in accordance with international application WO 91/13918.

Irrespective of the processes described for preparing the dimer diols, dimer diols used with preference are those prepared from $C_{18}$ fatty acids or their esters and/or from $C_{18}$ % fatty alcohols. In this way, dimer diols having 36 carbon atoms are predominantly formed.

Dimer diols prepared by the abovementioned industrial processes always include varying amounts of trimeric triols and monofunctional alcohols. Generally speaking, the fraction of dimeric molecules here is more than 70 wt %, and the balance is made up of trimeric molecules and monomeric molecules. For the purposes of the invention, if is possible to use both these dimer diols and also more pure dimer diols with more than 90 wt % of dimeric molecules. Especially preferred are dimer diols with more than 90 to 99 wt % of dimeric molecules, of which preference in turn is given to those dimer diols whose double bonds and/or aromatic radicals are at least partly or completely hydrogenated.

The hydroxyl functionality of the dimer diols ought preferably to be 1.8 to 2.2.

For the purposes of the present invention, therefore, it is particularly preferred for the dimer diols used to be those preparable by hydrogenation from the dimer fatty acids of component (a). Especially preferred dimer diols are those which consist of ≥90 wt % of dimeric molecules, ≤5 wt % of trimeric molecules, and ≤ than 5 wt % of monomeric molecules and of other byproducts, and/or have a hydroxyl functionality of 1.8 to 2.2. Particular preference is given to using those diols preparable by hydrogenation from dimer fatty acids which consist of 95 to 98 wt % of dimeric molecules, less than 5 wt % of trimeric molecules, and of less than 1 wt % of monomeric molecules and of other byproducts. Likewise particularly preferred is the use of those diols preparable by hydrogenation from dimer fatty acids which consist ≥98 wt % of dimeric molecules, ≤1.5 wt % of trimeric molecules, and of ≤0.5 wt % of monomeric molecules and of other byproducts.

Depending on reaction regime, dimer fatty acids which can be used for preparing the dimer diols include not only aliphatic but also aromatic molecular fragments.

The aliphatic molecular fragments may be subdivided further into linear and cyclic fragments, which may in turn be saturated or unsaturated. Through hydrogenation, the aromatic and also the unsaturated aliphatic molecular fragments can be converted into corresponding saturated aliphatic molecular fragments. The dimer diols used as component (b), accordingly, may be saturated or unsaturated.

For the purposes of the present invention it is preferable to use those dimer diols which are preparable by hydrogenating the carboxylic acid groups of preferably saturated dimer fatty acids.

Particularly preferred diols are those preparable by hydrogenation of dimer fatty acids which consist of ≥98 wt % of dimeric molecules, ≤1.5 wt % of trimeric molecules, and of ≤0.5 wt % of monomeric molecules and of other byproducts.

With particular preference the dimer diols possess a hydroxyl number of 170 to 215 mg KOH/g, very preferably of 195 to 212 mg KOH/g, and more particularly 200 to 210 mg KOH/g, determined by means of DIN ISO 4629. With particular preference the dimer diols also possess a viscosity of 1500 to 5000 mPas, very preferably 1800 to 2800 mPas (25√ C., Brookfield, ISO 2555).

Dimer diols for especially preferable use are the commercial products Pripol® 2030 and especially Priopol® 2033 from Uniquema or Sovermol® 908 from Cognis.

There are no peculiarities to the preparation of the dimer fatty acid/dimer diol reaction product of the invention. The esterification takes place commonly with the aid of a water separator. Components (a) and (b) here are used in a molar ratio of 0.7/2.3 to 1.3/1.7, preferably of 0.8/2.2 to 1.2/1.8, and very preferably of 0.9/2.1 to 1.1/1.9. The reaction is discontinued when the dimer fatty acid/dimer diol reaction product of the invention possesses an acid number of <10 mg KOH/g. Preferably it possesses an acid number of <7.5 mg KOH/g, and very preferably of <5 mg KOH/g. The acid number here is determined by means of DIN 53402.

The resulting dimer fatty acid/dimer diol reaction product possesses a number-average molecular weight $M_n$ of 1200 to 5000 g/mol, preferably 1200 to 4500 g/mol, and very preferably 1200 to 4000 g/mol. The number-average molecular weight very preferably has a lower limit of 1300, 1400 or 1500 g/mol for all embodiments of the invention.

The dimer fatty acid/dimer diol reaction products of the invention possess a low water solubility. Where they are used in aqueous systems, they accumulate at the interfaces, owing to their incompatibility, and are therefore in a position to contribute to improving the adhesion with respect to adjacent coats.

If a number-average molecular weight of 5000 g/mol is exceeded, the solubility of the dimer fatty acid/dimer diol reaction products of the invention in aqueous systems may be so low that they tend toward crystallization and may be precipitated. If the eventual number-average molecular weight is below 1200 g/mol, the water solubility of said dimer fatty acid/dimer diol reaction product may increase to such an extent that it is no longer able to accumulate in sufficient concentration at the interfaces. An improvement in adhesion can then no longer be achieved.

Particularly preferred embodiments are specified below.
a) In one particularly preferred embodiment of the dimer fatty acid/dimer diol reaction product of the invention, the dimer fatty acid is prepared from linolenic, linoleic and/or oleic acid, and consists of at least 98 wt % of dimeric molecules, less than 1.5 wt % of trimeric molecules, and less than 0.5 wt % of monomeric molecules and of other byproducts.
b) In a further particularly preferred embodiment of the dimer fatty acid/dimer diol reaction product of the invention, the dimer diol for use in accordance with, the invention is a dimer fatty acid hydrogenated to the diol.
c) In another particularly preferred embodiment of the dimer fatty acid/dimer diol reaction product of the invention, components (a) and (b) are used in a molar ratio of 0.9/2.1 to 1.1/1.9.
d) In a further particularly preferred embodiment of the dimer fatty acid/dimer diol reaction product of the invention, the product possesses an acid number of <5 mg KOH/g.
e) In a further particularly preferred embodiment of the dimer fatty acid/dimer diol reaction product of the invention, said product possesses a number-average molecular weight of 1200 to 4000 g/mol.

In an especially preferred embodiment of the dimer fatty acid/dimer diol reaction product of the invention, all features specified under a) to e) are realized in combination.

The present invention relates further to a pigmented aqueous basecoat material which comprises at least one dimer fatty acid/dimer diol reaction product of the invention.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating material in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn the water fraction is 40 to 90 wt %, more particularly 50 to 80 wt %, very preferably 60 to 75 wt %, based in each case on the total amount of solvents present.

A basecoat material is to be understood as a color-imparting intermediate coating material that is used in automotive finishing and in general industrial coating. This basecoat material is generally applied to a metallic or plastics substrate which has been pretreated with surfacer or primer-surfacer, or else, occasionally, directly to the plastics substrate. Substrates used may also include existing paint systems, which may optionally require pretreatment as well (by abrading, for example). It is presently entirely customary to apply more than one basecoat film. Accordingly, in such a case, a first basecoat film represents the substrate for a second such film. In order to protect a basecoat film against influences of the environment in particular, at least one additional clearcoat film is typically applied to it as well.

The sum total of the weight-percentage fractions, based on the total weight of the pigmented aqueous baseeoat material, of all dimer fatty acid/dimer diol reaction products of the invention is preferably 0.1 to 30 wt %, more preferably 1 to 20 wt %, and very preferably 1.5 to 15 wt % or even 2 to 12 wt %.

If the amount of dimer fatty acid/dimer diol reaction product of the invention is below 0.1 wt %, it may be possible that an improvement in the adhesion is no longer achieved. If the amount is more than 30 wt %, then disadvantages may occur, such as, for example, incompatibility between said dimer fatty acid/dimer diol reaction product and the baseeoat material. Such incompatibility may be manifested, for example, in uneven leveling and also in floating or settling.

As already described above, the dimer fatty acid/dimer diol reaction product of the invention is of sparing solubility in aqueous systems. It is therefore preferably used directly during the production of the pigmented aqueous baseeoat material, and not only added to the otherwise complete baseeoat material after production has taken place.

In one preferred embodiment the sum total of the weight-percentage fractions of all dimer fatty acid/dimer diol reaction products of the invention is 0.1 to 30 wt %, based on the total weight of the pigmented aqueous basecoat material. Where preferred embodiments of the dimer fatty acid/dimer diol reaction products of the invention are used, the sum total of the weight-percentage fractions of all preferred embodiments of the dimer fatty acid/dimer diol reaction products of the invention is preferably likewise 0.1 to 30 wt %, based on the total weight of the pigmented aqueous basecoat material. With particular preference the pigmented aqueous basecoat material comprises, as dimer fatty acid/dimer diol reaction products of the invention, exclusively preferred embodiments of the dimer fatty acid/dimer diol reaction products of the invention.

In one preferred embodiment the sum total of the weight-percentage fractions of ail dimer fatty acid/dimer diol reaction products of the invention is 1 to 20 wt %, based on the total weight of the pigmented aqueous basecoat material. Where preferred embodiments of the dimer fatty acid/dimer diol reaction products of the invention are used, the sum total of the weight-percentage fractions of all preferred embodiments of the dimer fatty acid/dimer diol reaction products of the invention is preferably likewise 1 to 20 wt %, based on the total weight of the pigmented aqueous basecoat material. With particular preference the pigmented aqueous basecoat material comprises, as dimer fatty acid/dimer diol reaction products of the invention, exclusively preferred embodiments of the dimer fatty acid/dimer diol reaction products of the invention.

In one especially preferred embodiment the sum total of the weight-percentage fractions of all dimer fatty acid/dimer diol reaction products of the invention is 1.5 to 15 wt %, based on the total weight of the pigmented aqueous basecoat material. Where preferred embodiments of the dimer fatty acid/dimer diol reaction products of the invention are used, the sum total of the weight-percentage Inactions of all preferred embodiments of the dimer fatty acid/dimer diol reaction products of the invention is preferably likewise 1.5 to 15 wt %, based on the total weight of the pigmented aqueous basecoat material. With particular preference the pigmented aqueous basecoat material comprises, as dimer fatty acid/dimer diol reaction products of the invention, exclusively preferred embodiments of the dimer fatty acid/dimer diol reaction products of the invention.

In one likewise especially preferred embodiment the sum total of the weight-percentage fractions or all dimer fatty acid/dimer diol reaction products of the invention is 2 to 12 wt %, based on the total weight of the pigmented aqueous baseeoat material. Where preferred embodiments of the dimer fatty acid/dimer diol reaction products of the invention are used, the sum total of the weight-percentage fractions of all preferred embodiments of the dimer fatty acid/dimer diol reaction products of the invention is preferably likewise 2 to 12 wt %, based on the total weight of the pigmented aqueous baseeoat material. With particular preference the pigmented aqueous baseeoat material comprises, as dimer fatty acid/dimer diol reaction products of the invention, exclusively preferred embodiments of the dimer fatty acid/dimer diol reaction products of the invention.

Examples of embodiments of the dimer fatty acid/dimer diol reaction products of the invention that are preferred in this sense include the following particularly preferred embodiments:

a) In one particularly preferred embodiment of the dimer fatty acid/dimer diol reaction product of the invention, the dimer fatty acid is prepared from linolenic, linoleic and/or oleic acid and consists of at least 98 wt % of dimeric molecules, less than 1.5 wt % of trimeric molecules, and less than 0.5 wt % of monomeric molecules and of other byproducts.

b) In a further particularly preferred embodiment of the dimer fatty acid/dimer diol reaction product of the invention, the dimer diol for use in accordance with the invention is a dimer fatty acid hydrogenated to the diol.

c) In a further particularly preferred embodiment of the dimer fatty acid/dimer diol reaction product of the invent ion, components (a) and (b) are used in a molar ratio of 0.9/2.1 to 1.1/1.9.

d) In a further particularly preferred embodiment of the dimer fatty acid/dimer diol reaction product of the invention, said product possesses an acid number of <5 mg KOH/g.

e) In a further particularly preferred embodiment of the dimer fatty acid/dimer diol reaction product of the invention, said product possesses a number-average molecular weight of 1200 to 4000 g/mol.

As a further example of embodiments of the dimer fatty acid/dimer diol reaction products of the invention that are preferred in this sense, mention may be made of those embodiments which realize all of the features indicated under a) to e), in combination.

The basecoat materials used in accordance with the invention comprise color and/or effect pigments. Such color pigments and effect pigments are known to the skilled person and are described for example in Römpp-Lexikon Lacke und Druckfarben, Georg Thieme Verlag, Stuttgart, N.Y., 1998, pages 176 and 451. The fraction of the pigments may be situated for example in the range from 1 to 40 wt %, preferably 2 to 30 wt %, more preferably 3 to 25 wt %, based on the total weight of the pigmented aqueous basecoat material.

For the purposes of the present invention, basecoat materials used with preference are those which as binders comprise physically curable or thermally curable binders or binders curable both thermally and with actinic radiation. Binders herein, in accordance with the relevant DIN EN ISO 4618, are understood to be the nonvolatile fraction of a coating material, without pigments and fillers. Specific binders in this sense are therefore, for example, crosslinking agents and typical coatings additives as well, and also all other nonvolatile constituents, apart from the pigments and fillers, despite the fact that in the text below, the term "binder" is used primarily in relation to the principal binder component.

Besides the dimer fatty acid/dimer diol reaction product of the invention, the pigmented aqueous basecoat materials of the invention more preferably comprise at least one polyurethane resin. Coating materials of this kind comprising polyurethane resin may likewise commonly be cured physically, thermally, or both thermally and with actinic radiation.

For the purposes of the present invention, the terra "physical curing" denotes the formation of a film by loss of solvent from polymer solutions or polymer dispersions. Typically no crosslinking agents are necessary for this curing.

For the purposes of the present invention, the term "thermal curing" denotes the heat-initiated crosslinking of a coating film, with either a separate crosslinking agent or else self-crosslinking binders being employed in the parent coating material. The crosslinking agent comprises reactive functional groups which are complementary to the reactive functional groups present in the binders, This is commonly referred to by those in the art as external crosslinking. Where the complementary reactive functional groups or autoreactive functional, groups —that is, groups which react with groups of the same kind—are already present in the binder molecules, the binders present are self-crosslinking. Examples of suitable complementary reactive functional groups and autoreactive functional groups are known from German patent application DE 199 30 665 A1, page 7, line 28 to page 9, line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators.

Where thermal curing and curing with actinic light are employed in unison, the term "dual cure" is also used.

In the present invention preference is given both to basecoat materials which cure physically and to basecoat materials which cure thermally or both thermally and with actinic radiation, i.e., by "dual cure".

Thermally curing baseeoat materials are preferably those which comprise as binder (principal binder) a polyurethane resin and as crosslinking agent an aminoplast resin or a blocked or nonblocked polyisocyanate, preferably an aminoplast resin. Among the aminoplast resins, melamine resins are preferred.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin (A) may be present alongside the polymer originating from the polymerization of the olefinically unsaturated monomers, without them being joined to one another covalently. Likewise, however, the polyurethane resin (A) may also be joined covalently to the polymer originating from the polymerization of the olefinically unsaturated monomers. The olefinically unsaturated monomers are preferably monomers containing acrylate and/or methacrylate groups. It is likewise preferred for the monomers containing acrylate and/or methacrylate groups to be used in combination with further olefinically unsaturated compounds which contain no acrylate or methacrylate groups. Bonded to the polyurethane resin (A) more preferably as olefinically unsaturated. monomers are monomers containing acrylate or methacrylate groups, thereby forming polyurethane (meth)acrylates. Very preferably the polyurethane resin is a polyurethane (meth) acrylate. The polyurethane resin present with preference is curable physically, thermally, or both thermally and with actinic radiation. More particularly it is curable either thermally or both thermally and with actinic radiation. With particular preference the polyurethane resin comprises reactive functional groups through which external crosslinking is possible.

Suitable saturated or unsaturated polyurethane resins are described for example in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols are more particularly polyester polyols, especially those having a number-average molecular weight of 400 to 5000 g/mol.

For hydrophilic stabilisation and/or for increasing the dispersibility in aqueous medium, the polyurethane resin preferably present may contain particular ionic groups and/ or groups which can be converted into ionic groups (potentially ionic groups). Polyurethane resins of this kind are referred to for the purposes of the present invention as ionically hydrophilically stabilised polyurethane resins. Likewise present may be nonionic hydrophilically modifying groups. Preferred, however, are the ionically hydrophilically stabilized polyurethanes. In more precise terms, the modifying groups are alternatively functional groups which can be converted into cations by neutralising agents and/or quaternizing agents, and/or cationic groups (cationic modification)

or functional groups which can be converted into anionic by neutralizing agents, and/or anionic groups (anionic modification)

and/or nonionic hydrophilic groups (non ionic modification).

As the skilled person is aware, the functional groups for cationic modification are, for example, primary, secondary and/or tertiary amino groups, secondary sulfide groups and/ or tertiary phosphine groups, more particularly tertiary amino groups and secondary sulfide groups (functional groups which, by neutralizing agents and/or quaternizing agents, can be converted into cationic groups). Also deserving of mention are the cationic groups—groups prepared from the aforementioned functional groups using neutralising agents and/or quaternizing agents that are known to the skilled person—such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic acid, sulfonic acid and/or phosphonic acid groups, more particularly carboxylic acid groups (functional groups which, by neutralizing agents, can be converted into anionic groups), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced for example through the incorporation of poly(ethylene) oxide polymers as lateral or terminal groups of the polyurethane molecules. The hydrophilic modifications are introduced, for example, via compounds which contain at least one group that is reactive toward isocyanate groups—preferably at least one hydroxyl group. To introduce the ionic modification it is possible to use monomers which as well as the modifying groups contain at least one hydroxyl group. To introduce the nonionic modifications, preference is given to using the polyetherdiols and/or alkoxypoly(oxyalkylene) alcohols that are known to the skilled person.

The polyurethane resin may preferably be a graft polymer. More particularly it is a polyurethane resin grafted with olefinically unsaturated compounds, preferably olefinically unsaturated monomers. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to be side chains which are constructed during the graft polymerisation, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion. In this case the polyurethane resin present in the primary dispersion may contain lateral and/or terminal olifinically unsaturated groups via which, then, the graft polymerization with the olifinically unsaturated compounds proceeds. The polyurethane resin for grafting may therefore be an unsaturated polyurethane resin (A). The graft polymerisation is in that case a radical polymerization of olifinically unsaturated reactants. Also possible, for example, is for the olifinically unsaturated compounds used for the graft polymerisation to contain at least one hydroxyl group. In that case it is also possible first for there to be attachment :of the olifinically unsaturated compounds via these hydroxyl groups through reaction with free isocyanate groups of the polyurethane resin. This attachment takes place instead of or in addition to the radical reaction of the olifinically unsaturated compounds with the lateral and/or terminal olifinically unsaturated groups optionally present in the polyurethane resin. This is then followed again by the graft polymerization via radical polymerization, as described earlier on above. The result in any case is polyurethane resins grafted with olifinically unsaturated compounds, preferably olifinically unsaturated monomers.

As olefinically unsaturated compounds with which the polyurethane resin (A) is preferably grafted it is possible to use virtually all radically polymerizable, olefinically unsaturated, and organic monomers which are available to the skilled person for these purposes. A number of preferred monomer classes may be specified by way of example;

Hydroxyalkyl esters of (meth)acrylic acid or of other alpha, beta-ethylenically unsaturated carboxylic acids, (meth)acrylic acid alkyl and/or cycloalkyl esters having up to 20 carbon atoms in the alkyl radical, ethylenicaily unsaturated monomers comprising at least one acid group, more particularly exactly one carboxyl group, such as (meth)acrylic acid, for example, vinyl esters of monocarboxylic acids which are branched in alpha-position and have 5 to 18 carbon atoms, reaction products of (meth)acrylic acid with the glycidyl ester of a monocarboxylic acid which is branched in alpha-position and has 5 to 18 carbon atoms, further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth) acrylate groups, and so the side chains attached by grafting are poly(math)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polymerisation of polyisocyanates and polyols to polyurethanes, and the graft polymerization that preferably then follows with olifinically unsaturated compounds. These methods are known to the skilled person and can be adapted individually. Exemplary preparation processes and reaction conditions can be found in European patent EP 0521 928 B1, page 2, line 57 to page 8, line 16.

By film-forming solids, corresponding to the binder content, is meant the nonvolatile weight fraction of the basecoat material, without pigments and any fillers present. The film-forming solids can be determined as follows: A sample of the pigmented aqueous baseeoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids is obtained by weighing.

The polyurethane resin content is preferably between 5 and 80 wt %, more preferably between 8 and 70 wt %, and very preferably between 10 and 60 wt %, based in each case on the film-forming solids of the baseeoat material.

The polyurethane resin preferably present preferably possesses a number-average molecular weight of 200 to 30 000 g/mol, more preferably of 2000 to 20 000 g/mol. It further possesses, for example, a hydroxyl number of 0 to 250 rog KOH/g, but more particularly from 20 to 25 150 mg KOH/g. The acid number of the polyurethane resin is preferably 5 to 200 mg KOH/g, more particularly 10 to 40 mg KOH/g. The hydroxyl number is determined in accordance with DIN/ISO 4629, the acid number in accordance with DIN 53402.

The pigmented aqueous basecoat material for use may further comprise at least one polyester different from the dimer fatty acid/dimer diol reaction products of the invention, more particularly a polyester having a number-average molecular weight of 400 to 5000 g/mol. Such polyesters are described in DE 4009858 in column 6, line 53 to column 7, line 61 and column 10, line 24 to column 13, line 3.

There is preferably also a thickener present. Suitable thickeners are inorganic thickeners from the group of the phyllosilicates. Besides the: inorganic thickeners, however, there may also be one or more organic thickeners used. These thickeners are preferably selected from the group consisting of (meth)acrylic acid-(meth)acrylate copolymer thickeners, such as, for example, the commercial product Rheovis® AS S130 (Ciba, BASF), and polyurethane thickeners, such as, for example, the commercial product Rheovis® PU 1250 from BASF. The thickeners used are different from the binders used.

Furthermore, the pigmented aqueous basecoat material may further comprise at least, one adjuvant. Examples of such adjuvants are salts which can be decomposed thermally without residue or substantially without residue, resins as binders that are curable physically, thermally and/or with actinic radiation and are different from polyurethane resins, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and flatting agents.

Suitable adjuvants of the aforementioned kind are known for example from
German patent application DE 199 48 004 A1, page 14, line 4, to page 17, line 5, and
German patent DE 100 43 405 C1, column 5, paragraphs [0031] to [0033].

They are used in the customary and known amounts.

The solids content of the basecoat materials used, in accordance with the invention may vary according to the requirements of the specific case. The solids content, is guided primarily by the viscosity required for application, more particularly for spray application, and so may be adjusted by the skilled person on the basis of his or her general art knowledge, optionally with assistance from a few rangefinding tests.

The solids content of the basecoat materials is preferably 5 to 70 wt %, more preferably 8 to 60 wt %, and very preferably 12 to 55 wt %.

By solids content is meant the weight fraction which remains as a residue on evaporative concentration under specified conditions. In the present specification the solids has been determined in accordance with DIN EN ISO 3251. This is done by subjecting the coating material to evaporative concentration at 130° C. for 60 minutes.

The basecoat materials employed in accordance with the invention may be produced using the mixing assemblies and mixing techniques that are customary and known for producing basecoat materials.

A further aspect of the present, invention is a method for producing a multicoat paint system, where
(1) a pigmented aqueous baseeoat material is applied to a substrate,
(2) a polymer film is formed from the coating material applied in stage (1),
(3) a clearcoat material is applied to the resulting baseeoat film, and subsequently
(4) the baseeoat film is cured together with the clear coat film,
this method comprising the use in stage (1) of a pigmented aqueous baseeoat material which comprises the dimer fatty acid/dimer diol reaction product of the invention. All observations above concerning the dimer fatty acid/dimer diol reaction product of the invention and concerning the pigmented aqueous basecoat material also apply in respect of the use according to the invention. This is also true more particularly of all preferred, very preferred, and especially preferred features.

Said method is employed preferably for producing multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may also be applied, optionally, directly to the plastics substrate.

Where a metallic substrate is to be coated, it is preferably further coated with an electrocoat system before the surfacer or primer-surfacer is applied.

Where a plastics substrate is coated, it is preferably further pretreated before the surfacer or primer-surfacer is applied. The techniques most frequently employed. for such pretreatment are those of flaming:, plasma treatment, and corona discharge. Flaming is used with preference.

Application of the pigmented aqueous basecoat material used in accordance with the invention to a metallic substrate may take place at the film, thicknesses customary in the context of the automobile industry, in the range from, for example, 5 to 100 micrometers, preferably 5 to 60 micrometers. This is done using spray application methods, such as, for example, compressed-air spraying, airless spraying, high-speed rotation, electrostatic spray application (ESTA), optionally in association with hot-spray application such as hot-air hot spraying, for example.

After the pigmented aqueous basecoat material has been applied, it may be dried in accordance with known methods, (1K [One-component]) basecoat materials, for example, may be flashed at room temperature for 1 to 60 minutes and thereafter dried preferably at optionally slightly elevated temperatures of 30 to 80° C. Flashing and drying for the purposes of the present invention refer to evaporation of organic solvents and/or water, through which the paint becomes drier, but is not yet cured. In other words there is as yet no fully crosslinked coating film formed.

Then a commercial clearcoat material is applied, by likewise common methods, the film thicknesses again being situated in the customary ranges, 5 to 100 micrometers for example.

After the clear coat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multiple-coat color and/or effect paint system of the invention. Curing takes place preferably thermally at temperatures from 60 to 200° C. Thermally curing basecoat materials are preferably those which comprise as additional binder a polyurethane resin and as crosslinking agent an aminoplast resin or a blocked or nonblocked polyisocyanate, preferably an aminoplast resin. Among the aminoplast resins, melamine resins are preferred.

The coating of plastics substrates takes place basically in the same way as that of metallic substrates. Here, however, in general, curing takes place at significantly lower temperatures, of 30 to 90° C. Preference is therefore given to the use of two-component clearcoat materials. Preference is further given to use of basecoat materials which comprise a polyurethane resin as binder, but no crosslinker.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted a second time, likewise by means of the method of the invention.

The invention relates further to muiticoat paint systems which are producible by the method described above. These muiticoat paint systems are to be referred to below as muiticoat paint systems of the invention.

All of the observations above concerning the dimer fatty acid/dimer diol reaction product of the invention, the pigmented aqueous baseeoat material, and the method of the invention are also applicable, correspondingly, to said muiticoat paint system. This is also true in particular of all preferred, very preferred, and especially preferred features.

The multicoat paint systems of the invention are preferably multicoat color paint systems, effect paint systems, and color and effect paint systems.

A further aspect of the invention relates to the method of the invention, said substrate from stage (1) comprising a multicoat paint system which possesses defects.

The method of the invention is suitable accordingly for repairing defects on multicoat paint systems. Film defects are, generally speaking, disturbances on and in the coating, named usually according to their shape or their appearance. The skilled person, is aware of a host of possible kinds of such film defects. They are described for example in Römpp-Lexikon Lacke und Druckfarben, Georg Thieme Verlag, Stuttgart, N.Y., 1998, page 235, "Film defects".

The multicoat paint systems produced by means of the method of the invention may likewise have such defect sites. In one preferred embodiment of the method of the invention, therefore, the substrate from stage (1) is a multicoat paint system of the invention which exhibits defects.

These multicoat paint systems are produced preferably on automobile bodies or parts thereof, by means of the method of the invention, identified above, in the context of automotive OEM finishing, Where such defect sites occur directly after OEM finishing has taken place, they are repaired immediately. The term "OEM automotive refinishing" is therefore also used. Where only small defect sites require repair, repair takes place not to the whole body (dual finishing), but instead just to what is called the "spot". This operation is called "spot repair". Particular preference is therefore given to the use of the method of the invention for repairing defects on multicoat paint systems of the invention in OEM automotive refinishing.

So that the repaired site does not differ in color from the rest of the original finish, it is preferred for the aqueous basecoat material used in stage (1) of the method of the invention for repairing defects to be the same as that used in the method of the invention for producing the multicoat paint system of the invention.

The observations above concerning the dimer fatty acid/dimer diol reaction product of the invention and the aqueous pigmented basecoat material therefore also apply in respect of the use in question of the method of the invention for repairing defect sites on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defects on the multicoat paint system of the invention can be repaired by means of the above-described method of the invention. For this purpose, the surface to be repaired on the multicoat paint system may initially be abraded. This is followed by application of the pigmented aqueous basecoat material to the defect in the original finish, by pneumatic atomization. Following the application of the pigmented aqueous basecoat material, it can be dried by known methods, for example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise a polyurethane resin as binder and an aminoplast resin, preferably a melamine resin, as crosslinking agent.

A commercial clearcoat material is subsequently applied, by techniques that are likewise commonplace. Following application of the clearcoat material, it may be flashed at room temperature for 1 to 60 minutes, for example, and optionally dried. The clearcoat material is then cured together with the applied pigmented basecoat material.

In the case of what is called low-temperature baking, curing is accomplished preferably at temperatures of 20 to 90° C. Two-component clearcoat materials are preferably employed here. If, as described above, a polyurethane resin is used as further binder and an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C.

In the case of what is called high-temperature baking, curing is accomplished preferably at temperatures of 130 to 150° C. Here both one-component and two-component, clearcoat materials are used. If, as described above, a polyurethane resin is used as further binder and an aminoplast resin is used as crosslinking agent, there is crosslinking by the aminoplast resin in the basecoat film at these temperatures.

A further aspect of the present invention is the use of the dimer fatty acid/dimer diol reaction product of the indention in pigmented aqueous basecoat materials for improving adhesion. This improvement. in adhesion, referred to is an improvement relative to those pigmented aqueous basecoat materials which do not contain any dimer fatty acid/dimer diol reaction product of the invention.

The dimer fatty acid/dimer diol reaction product of the invention can be used for improving adhesion in the context of the painting of metallic and plastics substrates. It can also be used in automotive refinishing. By automotive refinishing is meant not only OEM automotive refinishing but also the automotive refinishing which takes place, for example, in a workshop.

Where said pigmented aqueous basecoat materials are used in the painting of metallic and plastics substrates, the use of the dimer fatty acid/dimer diol reaction product of the invention leads in particular to an improvement in the adhesion between the basecoat film and the clearcoat film immediately adjacent to it. The dimer fatty acid/dimer diol reaction product of the invention is therefore used preferably for improving adhesion between basecoat film and clearcoat film in the context of the painting of metallic and plastics substrates Where said pigmented, aqueous basecoat materials axe used in automotive refinish, the use of the dimer fatty acid/dimer diol reaction product of the invention leads in particular to improved adhesion between basecoat material and original finish. The dimer fatty acid/dimer diol reaction product of the invention is therefore also used with preference for improving the adhesion between basecoat finish and original, finish in automotive, re-finish, more preferably in OEM automotive refinish.

The adhesion problems are especially striking when the coated substrates are exposed to weathering, feathering conditions of this kind can be simulated by what is called condensation-water storage. The term "condensation-water storage" denotes the storage of coated substrates in a climate chamber in accordance with CH test conditions according to DIN EN ISO 6270-2:2005-09.

The dimer fatty acid/dimer diol reaction products of the invention are therefore also used especially in order to improve the adhesion after condensation-water storage. The adhesion is investigated preferably by means of a steam jet test according to test method A of DIN 55662:2009-12.

When coated substrates are exposed to weathering, poor adhesion is also manifested in particular in the occurrence of blisters and swelling. The dimer fatty acid/dimer diol reaction products of the invention are therefore also used in particular to reduce or prevent the occurrence of blisters and swelling. The presence of blisters and swelling in this context may be appraised visually.

The invention is illustrated below using examples.

EXAMPLES

The dimer fatty acid used contains less than 1.5 wt % of trimeric molecules, 98 wt % of dimeric molecules, and less than 0.3 wt % of fatty acid (monomer), and is prepared on the basis of linolenic, linoleic, and oleic acid.

Polyester 1 (P1):

Prepared as per example D, column 16, lines 37 to 59 of DE 4009858 A. The corresponding polyester dispersion has a solids content of 60 wt %, the solvent used being butyl glycol instead of butanol.

Inventive Dimer Fatty Acid/Dimer Diol Reaction Product 1 (DD1)

In a 4 l stainless steel reactor equipped with anchor stirrer, thermometer, condenser, thermometer for overhead temperature measurement, and water separator, 1100 g of dimer diol (Pripol® 2033 from Croda) having a hydroxyl number of 204 mg KOH/g, 579.3 g of dimer fatty acid (1 mol) (Pripol® 1012, from Croda) and 70.0 g of cyclohexane were heated to 100° C. in the presence of 1.3 g of di-n-butyltin oxide (Axion® CS 2455, from Chemtura). Heating was continued slowly until the onset of the condensation. Heating was then continued in steps to 220° C., with a maximum overhead temperature of 85° C. The progress of the reaction was monitored via determination of the acid number. When an acid number of ≤0.3 mg KOH/g was reached, any cyclohexane still present was removed by vacuum distillation. Cooling to room temperature gave a viscous resin.

Gas chromatography found a cyclohexane content of less than 0.1%.

Amount of condensate (water): 34.9 g
Acid number: 0.1 mg KOH/g
Solids content (60 min at 130° C.): 95.6%
Solids content (GC): 100.0%
$M_n$ (number-average molar mass (vapor pressure osmosis)): 1640 g/mol
Viscosity (resin-xylene=2:1): 150.1 mPas, (measured at 23° C. using a rotational viscometer from Brookfield, CAP 2000+: spindle 3, shear rate: 13. 333 s$^{-1}$)

Inventive Dimer Fatty Acid/Dimer Diol Reaction Product 2 (DD2)

Analogously to the synthesis of the dimer fatty acid/dimer diol reaction product 1 (DD1), 1100 g of dimer diol. (Pripol® 2033, from Croda) having a hydroxyl number of 204 mg KOH/g, 578.0 g of hydrogenated dimer fatty acid (1 mol) (Pripol® 1009, from Croda) having an acid number of 194.1 mg KOH/g were esterified in the presence of 1.3 g of di-n-butyltin oxide (Axion® CS 2455, from Chemtura), 70.0 g of cyclohexane having been used in turn as entraining agent.

After distillation under vacuum of any cyclohexane still present, cooling to room temperature gave a viscous resin.

Gas chromatography found a cyclohexane content of less than 0.1%.

Amount of condensate (water): 35.5 g
Acid number: 0.2 mg KOH/g
Solids content (60 min at 130° C.): 99.9%
Solids content (GC): 100.0%
$M_n$ (number-average molar mass (vapor pressure osmosis)): 1630 g/mol
Viscosity (resin:xylene=2:1): 182.2 mPas, (measured at 23° C. with a rotational viscometer from Brookfield, CAP 2000+, spindle 3, shear rate: 13 333 s$^{-1}$)

Examples of Paint Formulations

1. Preparation of a Silver Waterborne Basecoat Material 1

The components listed under "aqueous phase" in table A were stirred together in the order stated to form an aqueous mixture. In the next step an organic mixture was prepared from the components listed under "organic phase". The organic mixture was added to the aqueous mixture. The combined mixture was then stirred for minutes and adjusted, using deionised water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE A

| Component | Parts by weight |
|---|---|
| Aqueous phase | |
| 3% strength Na—Mg phyllosilicate solution | 26 |
| Deionized water | 13.6 |
| Butyl glycol | 2.8 |
| Polyurethane-modified polyacrylate; prepared as per page 7, line 55 to page 8, line 23 of DE 4437535 A | 4.5 |
| 50% strength by weight solution of DSX 1550 (BASF), rheological agent | 0.6 |
| P1 | 3.2 |
| Tetramethyldecynediol (surfactant from BASF) | 0.3 |
| Melamine-formaldehyde resin (Cymel 203 from Cytec) | 4.1 |
| 10% strength dimethylethanolamine in water | 0.3 |
| Polyurethane-based graft copolymer; prepared as per page 19, line 44 to page 20, line 21 of DE 19948004 A | 20.4 |
| Tetramethyldecynediol (surfactant from BASF) | 1.6 |
| 3% strength by weight aqueous Viscalex HV 30 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Waterborne Basecoat Material E1:

To prepare the inventive waterborne basecoat material E1, a paint, was prepared in the same way as for the preparation of the waterborne basecoat material 1, using DD1 instead of polyester P1 both in the aqueous phase and in the organic phase. DD1 of the organic phase was first dissolved in a third of the amount of butyl glycol present in the organic phase. Additionally 0.984 part, by weight of butyl glycol was added to the organic phase to balance out the solvent content of the organic phase. DD1 of the aqueous phase was dissolved in 0.64 part by weight of butyl glycol, thereby also balancing out the solvent content of the aqueous phase.

Waterborne Basecoat Material E2:

To prepare the inventive waterborne basecoat material E2, a paint was prepared, in the same way as for the preparation of the waterborne basecoat material 1, using DD2 instead of polyester P1 both in the aqueous phase and in the organic phase. DD2 was first dissolved in a third of the amount of butyl glycol present in the organic phase. Additionally 0.984 part by weight of butyl glycol was added to balance out the solvent content of the organic phase, DD2 of the aqueous phase was dissolved in 0.64 part by weight of butyl glycol, thereby also balancing out the solvent content of the aqueous phase,

TABLE 1

Compositions of waterborne basecoat materials 1 and E1 to E2

| WBM | [wt %] | polymer solids |
|-----|--------|----------------|
| 1   | 4.92   | P1             |
| E1  | 4.92   | DD1            |
| E2  | 4.92   | DD2            |

The weight percentage figures in table 1 are based on the overall weight of the waterborne basecoat material.

Comparison Between Waterborne Basecoat Materials 1 and E1 to E2

To determine the stability with respect to the occurrence of blisters and swelling after condensation-water storage, the multicoat paint systems were produced in accordance with the following general protocol:

A steel panel coated with a standard cathodic electrocoat (Cathoguard® 800 from BASF Coatings GmbH) and with dimensions of 10×20 cm was coated with a standard surfacer (ALG 670173—surfacer, medium-gray, from Hemmelrath). After preliminary drying of the aqueous surfacer at 80° C. over a period of 10 minutes, the surfacer was baked at a temperature of 190° C. over a period of 30 minutes.

The respective waterborne basecoat material from table 1 was then applied pneumatically. The resulting waterborne basecoat film was flashed at room temperature for 2 minutes and subsequently dried in a forced-air oven at 70° C. for 10 minutes. A customary two-component clearcoat material (Progloss® 345 from BASF Coatings GmbH) was applied to the dried waterborne basecoat film. The resulting clearcoat film was flashed at room temperature for 20 minutes. The waterborne basecoat film and the clearcoat film were then cured in a forced-air oven at 160° C. for 30 minutes. The present system represents an overbaked original system and will be referred to below as the original finish.

This original finish is abraded with abrasive paper and then the respective waterborne basecoat material from table 1 is applied pneumatically to this abraded original finish. The resulting waterborne basecoat film was flashed at room temperature for 2 minutes and subsequently dried in a forced-air oven at 70° C. for 10 minutes. A so-called 80° C. two-component clearcoat material (FF230500 2K refinish clearcoat, scratchproof, from BASF Coatings GmbH) was applied to the dried waterborne basecoat film. The resulting clearcoat film was flashed at room temperature for 20 minutes. The waterborne basecoat film and the clearcoat film were then cured in a forced-air oven at 80° C. for 30 minutes:.

The steel panels thus treated were then stored over a period of 10 days in a conditioning chamber under CH test conditions according to DIN EN ISO 6270-2:2005-09. 24 hours after removal from the conditioning chamber, the panels were then inspected for blistering and swelling.

The occurrence of blisters was assessed as follows through a combination of 2 values:

The number of blisters was evaluated by a quantitative figure from 1 to 5, with m1 denoting very few and m5 very many blisters.

The size: of the blisters was evaluated by a size figure again from 1 to 5, with g1 denoting very small and g5 very large blisters.

The designation m0g0, accordingly, denotes a paint system which is blister-free after condensation-water storage, and represents a satisfactory result in terms of blistering.

TABLE 2

Blistering and swelling of waterborne basecoat materials 1 and E1 to E2

| WBM | Blistering | Swelling | Assessment |
|-----|------------|----------|------------|
| 1   | m5g1       | none     | unsat      |
| E1  | m0g0       | none     | sat        |
| E2  | m0g0       | none     | sat        |

Key:
m= number of blisters
g= size of blisters
sat = satisfactory result
unsat = unsatisfactory result The results confirm that when the polyesters of the invention are used there are no longer any blisters after condensation-water storage and there are no longer any visible instances of swelling.

2. Preparation of a Silver Waterborne Basecoat Material 2

The components listed under "aqueous phase" in table B were stirred together in the order stated to form an aqueous mixture, In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE B

| Component | Parts by weight |
|-----------|-----------------|
| Aqueous phase | |
| 3% strength Na—Mg phyllosilicate solution | 26 |
| Deionized water | 21.7 |
| Butyl glycol | 2.8 |
| Polyurethane-modified polyacrylate; prepared as per page 7, line 55 to page 8, line 23 of DE 4437535 A | 4.5 |
| 50% strength by weight solution of DSX 1550 (BASF), rheological agent | 0.6 |
| P1 | 13.3 |
| Tetramethyldecynediol (surfactant from BASF) | 0.3 |
| Melamine-formaldehyde resin (Cymel 203 from Cytec) | 4.1 |
| 10% strength dimethylethanolamine in water | 0.3 |
| Polyurethane-based graft copolymer; prepared as per page 19, line 44 to page 20, line 21 of DE 19948004 A | 1.8 |

TABLE B-continued

| Component | Parts by weight |
| --- | --- |
| Tetramethyldecynediol (surfactant from BASF) | 1.6 |
| 3% strength by weight aqueous Viscalex HV 30 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Waterborne Basecoat Material E3:

To prepare the inventive waterborne basecoat material E4, a paint was prepared in the same way as for the preparation of the waterborne basecoat material 2, using DD1 instead of polyester P1 both in the aqueous phase and in the organic phase, DD1 of the organic phase was first dissolved in a third of the amount of butyl glycol present in the organic phase. Additionally 1 part, by weight of butyl glycol was added to the organic phase to balance out the solvent constituent, DD1 of the aqueous phase was dissolved in 2.66 parts by weight of butyl glycol, thereby also balancing out the solvent content of the aqueous phase.

Waterborne Basecoat Material E4:

To prepare the inventive waterborne basecoat material E5, a paint was prepared in the same way as for the preparation of the waterborne basecoat material 2, using DD2 instead of polyester P1 both in the aqueous phase and in the organic phase. DD2 of the organic phase was first dissolved in a third of the amount of butyl glycol present in the organic phase. Additionally 1 part by weight of butyl glycol was added to the organic phase to balance out the solvent constituent, DD2 of the aqueous phase was dissolved in 2.66 parts by weight of butyl glycol, thereby also balancing out the solvent content of the aqueous phase.

TABLE 3

Compositions of waterborne basecoat materials 2 and E3 to E4

| WBM | [wt %] | polymer solids |
| --- | --- | --- |
| 2 | 10.98 | P1 |
| E3 | 10.98 | DD1 |
| E4 | 10.98 | DD2 |

The weight percentage figures in table 3 are based on the overall weight of the waterborne basecoat material.

Comparison Between Waterborne Basecoat Materials 2 and E3 to E4

To determine the stability with respect to the occurrence of blisters and swelling after condensation-water storage, the multicoat paint systems were produced in accordance with the following general protocol:

A steel panel coated with a standard cathodic electrocoat (Cathoguard® 800 from BASF Coatings GmbH) and with dimensions of 10×20 cm was coated with a standard surfacer (ALG 670173—surfacer, medium-gray, from Hemmelrath). After preliminary drying of the aqueous surfacer at 80° C. over a period of 10 minutes, the surfacer was baked at a temperature of 190° C. over a period of 30 minutes.

The respective waterborne basecoat material from table 3 was then applied pneumatically. The resulting waterborne basecoat film was flashed at room temperature for 2 minutes and subsequently dried in a forced-air oven at 70° C. for 10 minutes. A customary two-component clearcoat material (Progloss® 345 from BASF Coatings GmbH) was applied to the dried waterborne basecoat film. The resulting clearcoat film was flashed at room temperature for 20 minutes. The waterborne basecoat film and the clearcoat film were then cured in a forced-air oven at 160° C. for 30 minutes. The present system represents an overbaked original system and will be referred to below as the original finish.

This original finish is abraded with abrasive paper and then the respective waterborne baseeoat material, from table 3 is applied pneumatically to this abraded original finish. The resulting waterborne baseeoat film was flashed at room temperature for 2 minutes and subsequently dried in a forced-air oven at 70° C. for 10 minutes. A so-called 80° C. two-component clearcoat material (FF230500 2K refinish clearcoat, scratchproof, from BASF Coatings GmbH) was applied to the dried waterborne baseeoat film. The resulting clearcoat film was flashed at room temperature for 20 minutes. The waterborne baseeoat film and the clearcoat film were then cured in a forced-air oven at 80° C. for 30 minutes.

The steel panels thus treated were then stored over a period of 10 days in a conditioning chamber under CH test conditions according to DIN EN ISO 6270-2:2005-09. 24 hours after removal from the conditioning chamber, the panels were then inspected for blistering and swelling.

The occurrence of blisters was assessed as follows through a combination of 2 values:
- The number of blisters was evaluated by a quantitative figure from 1 to 5, with m1 denoting very few and m5 very many blisters.
- The size of the blisters was evaluated by a size figure again from 1 to 5, with g1 denoting very small and g5 very large blisters.
- The designation m0g0, accordingly, denotes a paint system which is blister-free after condensation-water storage, and represents a satisfactory result in terms of blistering.

TABLE 4

Blistering and swelling of waterborne basecoat materials 3 and E3 to E4

| WBM | Blistering | Swelling | Assessment |
| --- | --- | --- | --- |
| 2 | m5g4 | none | unsat |
| E3 | m0g0 | none | sat |
| E4 | m0g0 | none | sat |

Key:
m= number of blisters
g= size of blisters
sat = satisfactory result
unsat = unsatisfactory result The results confirm that when the polyesters of the invention are used there are no longer any blisters after condensation-water storage and there are no longer any visible instances of swelling.

The invention claimed is:

1. A method for producing a multiple-coat paint system, the method comprising:
   applying to a substrate a pigmented aqueous basecoat material which comprises a reaction product consisting of a dimer fatty acid and a dimer diol, which is obtained by reacting
   (a) said dimer fatty acid with
   (b) said dimer diol, wherein the dimer diol is prepared by
      (i) oligomerization of unsaturated fatty acids or esters thereof and subsequent hydrogenation of the acid or ester groups, or (ii) oligomerization of unsaturated fatty alcohols having 12 to 22 carbon atoms, where components (a) and (b) are reacted in a molar ratio of 0.7/2.3 to 1.3/1.7 and the resulting dimer fatty acid/dimer diol reaction product possesses a number-average molecular weight of 1200 to 5000 g/mol and an acid number <10 mg KOH/g;

forming a polymer film from the coating material applied in (1);

applying a clearcoat material to the resulting basecoat film; and subsequently curing the basecoat film together with the clearcoat film, and wherein said substrate is an automotive body or automotive component.

2. The method of claim 1, wherein the substrate from the applying (1) is a multicoat paint system which has defects.

3. The method of claim 1, wherein the substrate is an automotive body.

4. The method of claim 1, wherein the substrate is an automotive component.

5. The method of claim 1, wherein the dimer fatty acids and/or the dimer diols consist of at least 90 wt % of dimeric molecules, less than 5 wt % of trimeric molecules, and less than 5 wt % of monomeric molecules and of other byproducts and/or possess a hydroxyl functionality of 1.8 to 2.2.

6. The method of claim 1, wherein the dimer fatty acids are prepared from linolenic, linoleic and/or oleic acid and consist of ≥98 wt % of dimeric molecules, ≤1.5 wt % of trimeric molecules, and ≤0.5 wt % of monomeric molecules and of other byproducts.

7. The method of claim 1, wherein the dimer dial is prepared by (i) oligomerization of unsaturated fatty acids or esters thereof and subsequent hydrogenation of the acid or ester groups.

8. The method of claim 1, wherein components (a) and (b) are reacted in a molar ratio of 0.9/2.1 to 1.1/1.9.

9. The method of claim 1, wherein the dimer fatty acid/dimer diol reaction product has a number-average molecular weight of 1200 to 4000 g/mol.

10. The method of claim 1, wherein the dimer fatty acid/diner diol reaction product has an acid number of <5 mg KOH/g.

11. The method of claim 1, wherein the sum total of the weight-percentage fractions of all dimer fatty acid/dimer diol reaction products, based on the total weight of the pigmented aqueous basecoat material, is from 0.1 to 30 wt %.

12. The method of claim 1, wherein the pigmented aqueous basecoat material further comprises a polyurethane resin.

13. An automotive body or automotive component coated by a multiple-coat paint system according to the method of claim 1.

14. The method of claim 1, wherein the dimer diol is prepared by (ii) oligomerization of unsaturated fatty alcohols having 12 to 22 carbon atoms.

* * * * *